Patented Dec. 5, 1944

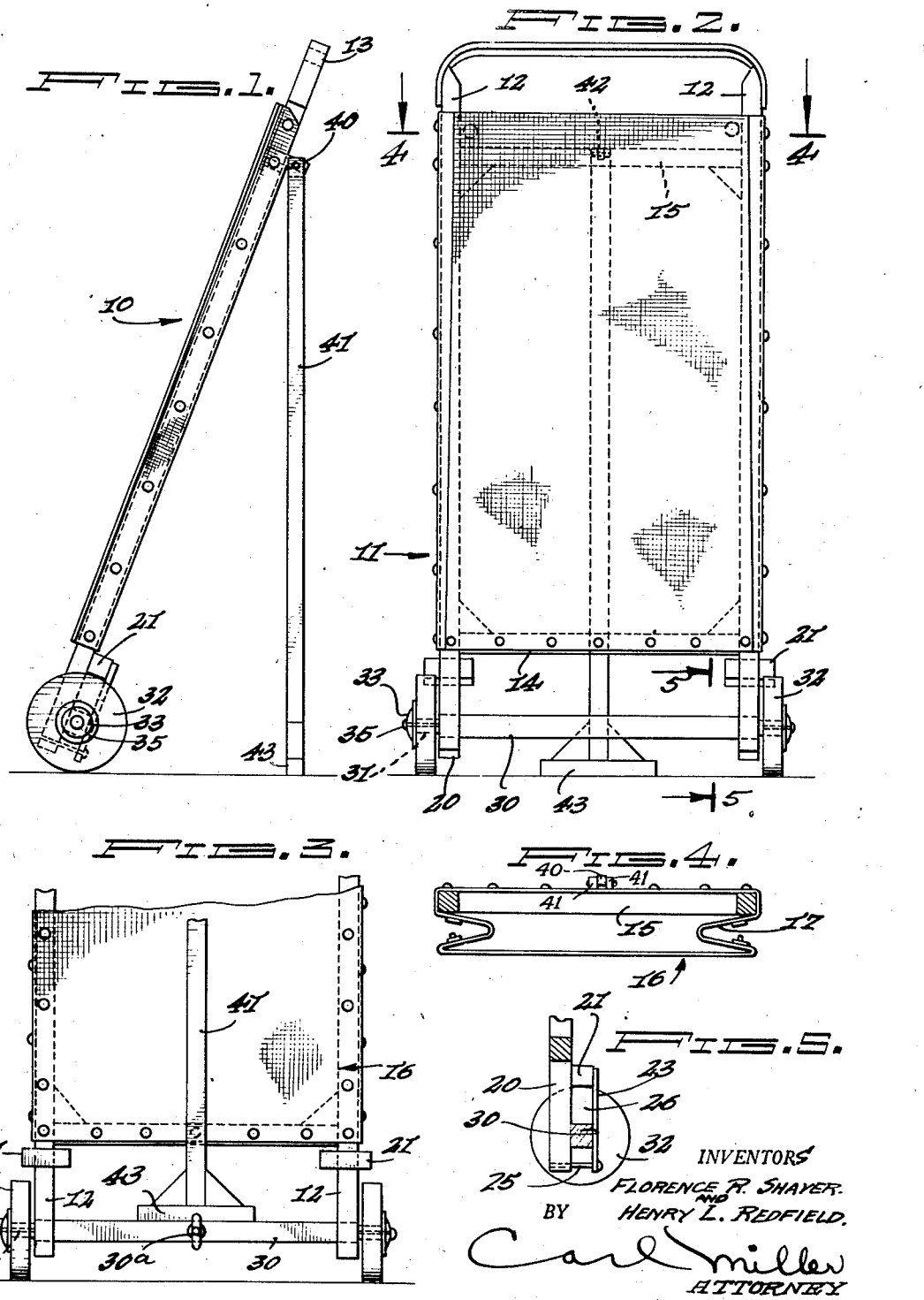

2,364,246

UNITED STATES PATENT OFFICE 2,364,246

TWO-WHEEL SHOPPING CART

Florence R. Shaver and Henry L. Redfield, Brooklyn, N. Y.

Application December 9, 1943, Serial No. 513,540

2 Claims. (Cl. 280—53)

This invention relates to two wheel shopping cart.

An object of this invention is to provide a cart of the character described having a balance support adapted to contact the ground to maintain the shopping cart in upwardly inclined position, the construction being such that the balancing support may be held against the cart when the car is in motion.

A further object of this invention is to provide a cart of the character described provided with wheel brakes adapted to engage the wheels when the cart is set to be supported by said support, the construction being such furthermore, that the brakes are released when the support is moved against the cart to permit the car to be set into motion.

A further object of this invention is to provide a shopping cart of the character described which shall be easy to manipulate, which shall be relatively inexpensive to manufacture, and yet practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawing in which is shown one of the various possible illustrative embodiments of this invention, Fig. 1 is a side elevational view of a cart embodying the invention, supported to stand by itself;

Fig. 2 is a front elevational view of the structure shown in Fig. 1;

Fig. 3 is a partial rear elevational view of the cart when in motion;

Fig. 4 is a cross-sectional view taken on line 4—4 of Fig. 2; and

Fig. 5 is a cross-sectional view taken on line 5—5 of Fig. 2.

Referring now in detail to the drawing, 10 designates a cart embodying the invention. The same comprises a frame 11 consisting of parallel side supports 12 interconnected at the top by a transverse handle 13. The side supports 12 are interconnected above their lower end by a transverse frame support 14. Below the handle is a second transverse frame support 15 parallel to frame portion 14.

Attached to the portions 12 and 14 of the frame is a flexible bag 16 open at the top. The bag 16 may be provided with bellows shaped side walls 17.

The side supports 12 extend below the transverse frame portion 14 as at 20. Attached to portions 20 are a pair of aligned transverse brake arms 21 extending outwardly beyond said portions. Fixed to the rear surfaces of members 21 are metal strips 23 connected at their lower end by screws or other similar members 25 to the lower ends of portions 20. This construction thus forms a slot 26 between each portion 20 and member 23 for the purpose hereinafter appearing.

Slidably mounted in the slots 26 is a horizontal axle 30. At the ends of the axle 30 are circular stud portions 31 on which are mounted wheels 32. The wheels may be held on the axles by washers 33 nailed or otherwise fastened to the ends of the axle as at 35.

It will be noted that the frame 11 may be lifted and lowered relative to the axle 30. When the frame is lowered the brake members 21 contact the wheels 32. When the frame is lifted the brake members 21 move out of contact with respect to said wheels.

Means is provided to retain the cart in self-supporting position. To this end there is fixed to the middle of the top frame portion 15 a rearwardly extending lug 40. Engaging said lug is a support 41 pivoted to the lug at its upper end as indicated at 42. At the lower end of member 41 is a transverse ground engaging member 43.

When the cart is lowered on the axles the brakes 21 engage the wheels 32 and the support 41 engages the ground as shown in Fig. 1 of the drawing so that the cart is self-supporting.

When it is desired to move the cart or set it in motion the frame 11 is lifted by the handle and the lower end of member 41 is moved into engagement with the top of the axle 30. On the central part of axle 30 is a latch 30a which may be rotated to engage portion 43 of the support 41 to keep it on the axle. In the position thus described the cart may be moved as the brakes are released. It will be noted that the support 41 maintains the frame in raised position so that the cart may be rolled along.

It will thus be seen that there is provided a device in which the several objects of this invention are achieved and which is well adapted to meet the conditions of practical use.

As various possible embodiments might be made of the above invention, and as various changes might be made in the embodiment above set forth, it is to be understood that all matter herein set forth or shown in the accompanying drawing is to be interpreted as illustrative and not in a limiting sense.

Having thus described our invention, we claim as new and desire to secure by Letters Patent:

1. In a two wheel shopping cart, a frame provided with a handle, a bag on said frame, an axle, said frame having means to slidably engage the axle, wheels on said axle, brakes on said frame adapted to engage the wheels when the frame is lowered and become disengaged from the wheels when the frame is raised, means to retain the frame in raised position to keep the brakes disengaged from the wheels, said means comprising a support hinged to the upper portion of the frame and adapted to engage the ground at its lower end for sustaining the cart when it is not in motion, said support being adapted to be swung against the cart, and the frame of the cart raised to permit the support to rest upon the axle.

2. In a two wheel shopping cart, a frame provided with a handle, a bag on said frame, an axle, said frame having means to slidably engage the axle, wheels on said axle, brakes on said frame adapted to engage the wheels when the frame is lowered and become disengaged from the wheels when the frame is raised, means to retain the frame in raised position to keep the brakes disengaged from the wheels, said means comprising a support hinged to the upper portion of the frame and adapted to engage the ground at its lower end for sustaining the cart when it is not in motion, said support being adapted to be swung against the cart, the frame of the cart raised to permit the support to rest upon the axle, and a latch means on the axle to engage the lower end of said support.

FLORENCE R. SHAVER.
HENRY L. REDFIELD.